Jan. 7, 1930.  C. E. LANDELL  1,742,917
CUSHION OR LIKE SPRING CONSTRUCTION
Filed June 2, 1927
Fig. 1.
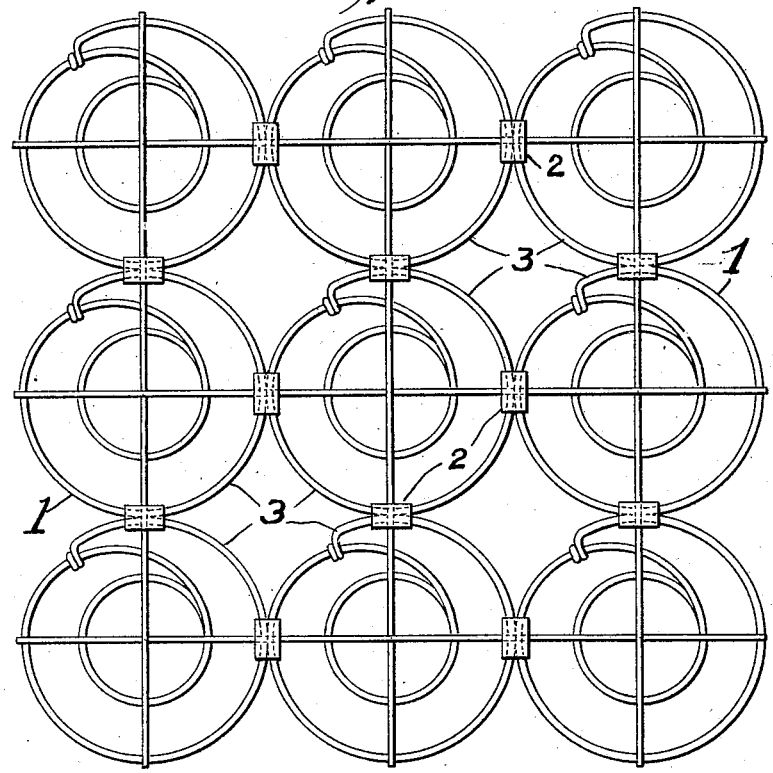
Fig. 2.
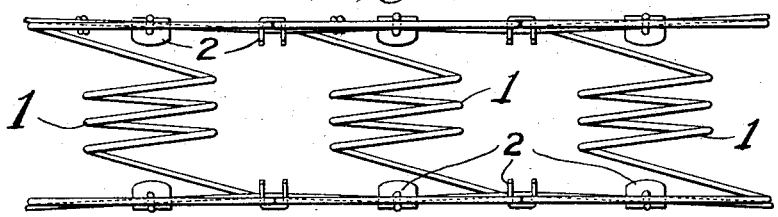
Fig. 3.  Fig. 4.
 
INVENTOR:
Coates E. Landell
BY
ATTORNEY.

Patented Jan. 7, 1930

1,742,917

UNITED STATES PATENT OFFICE

COATES E. LANDELL, OF PHILADELPHIA, PENNSYLVANIA, ASSIGNOR TO PEERLESS SPRINGS, INC., OF PHILADELPHIA, PENNSYLVANIA, A CORPORATION OF PENNSYLVANIA

CUSHION OR LIKE SPRING CONSTRUCTION

Application filed June 2, 1927. Serial No. 196,016.

This invention, generally stated, relates to springs for bed-bottoms, cushions, automobile seats, and the like, and has more especial relation to a clip and connecting rod connection for adjacent springs.

The leading object may be said to be the arranging of rows of coiled springs for bed bottoms, beds, couches, cushions, automobile cushions, and the like, in which the springs are in abutting relation, considered both laterally and longitudinally with the abutting portions of said springs attached together by U-shaped clips whereby the springs so associated provide for a better cushion effect.

A further object is to provide connecting rods which pass through the clips above mentioned to interlock the clips with respect to the springs, the rods crossing one another in diametrically disposed relation, considered in plan, above each spring coil.

A further object is to provide an arrangement and construction of parts for attaining the results sought by the foregoing objects and in which the stuffing or filling for the springs is relatively prevented from escape by the crossing of said connecting rods.

Other and further objects not at this time referred to will be hereinafter described.

The invention consists of the novel construction hereinafter described and finally claimed.

The nature, characteristic features and scope of the invention will be more fully understood from the following description taken in connection with the accompanying drawings forming part hereof, and in which:

Fig. 1, is a fragmentary view, in plan, of a spring construction embodying the invention.

Fig. 2, is an end view of Fig. 1.

Fig. 3, is a fragmentary view in section illustrating details of construction; and Fig. 4, is a view in perspective of a clip as shown in the foregoing figures.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a plurality of upstanding, coiled springs arranged to abut one against another in longitudinal and lateral directions as plainly seen in Fig. 1. The springs may be employed for bed bottoms, cushions, automobile seats and other commodities although especially designed for automobile use where it is required that the seat be maintained against sagging to the utmost degree. For this purpose, the springs are increased in number over a given area so as to abut and thus prevent the springs from leaning one toward another in use. To further prevent this leaning I introduce U-shaped clip-plates of integral structure designated 2. These clip-plates are fitted over the abutting ring parts 3 of adjacent springs 1 both laterally and longitudinally considered with respect to the horizontal plane of the spring assembly. Thus the clip-plates, considered in plan, are arranged in parallelism laterally and longitudinally considered. Each wing 4 of a clip-plate is apertured at 5 to receive a connecting rod 6, usually wire. These rods 6, penetrating the wings of the clip-plates, pass beneath the abutting ring parts 3 and the said rods bi-sect one another in alignment with the vertical axis of each spring. The advantages of the above described structure may be said to be an efficient and durable spring assembly at relatively small cost and an assembly in which unskilled labor may be employed. A compact spring assembly is provided in which the abutting springs are retained in upstanding or nearly vertical position at all times because of the interlock described. Further, because of the bisecting of connecting rods, escape of filling or stuffing from the spring assembly is greatly reduced.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

In a spring cushion, a plurality of upstanding coiled springs so arranged that the upper coils thereof abut one against another in longitudinal and lateral directions, and so arranged that the lower coils similarly abut, vertically disposed inverted U-shaped clip-plates connecting the upper coils of said abutting springs both longitudinally and laterally considered, U-shaped clip-plates similarly connecting the lower coils of said springs said plates having their opposed vertical walls curved at their outer edges, which walls are apertured, and diametrically disposed wires passing through the apertures of said clip-plates and bi-secting one another in alignment with the vertical axis of each of said springs.

COATES E. LANDELL.